Oct. 20, 1942.    G. G. LANDIS    2,299,329
WELDING TRANSFORMER
Filed April 28, 1939    2 Sheets-Sheet 1
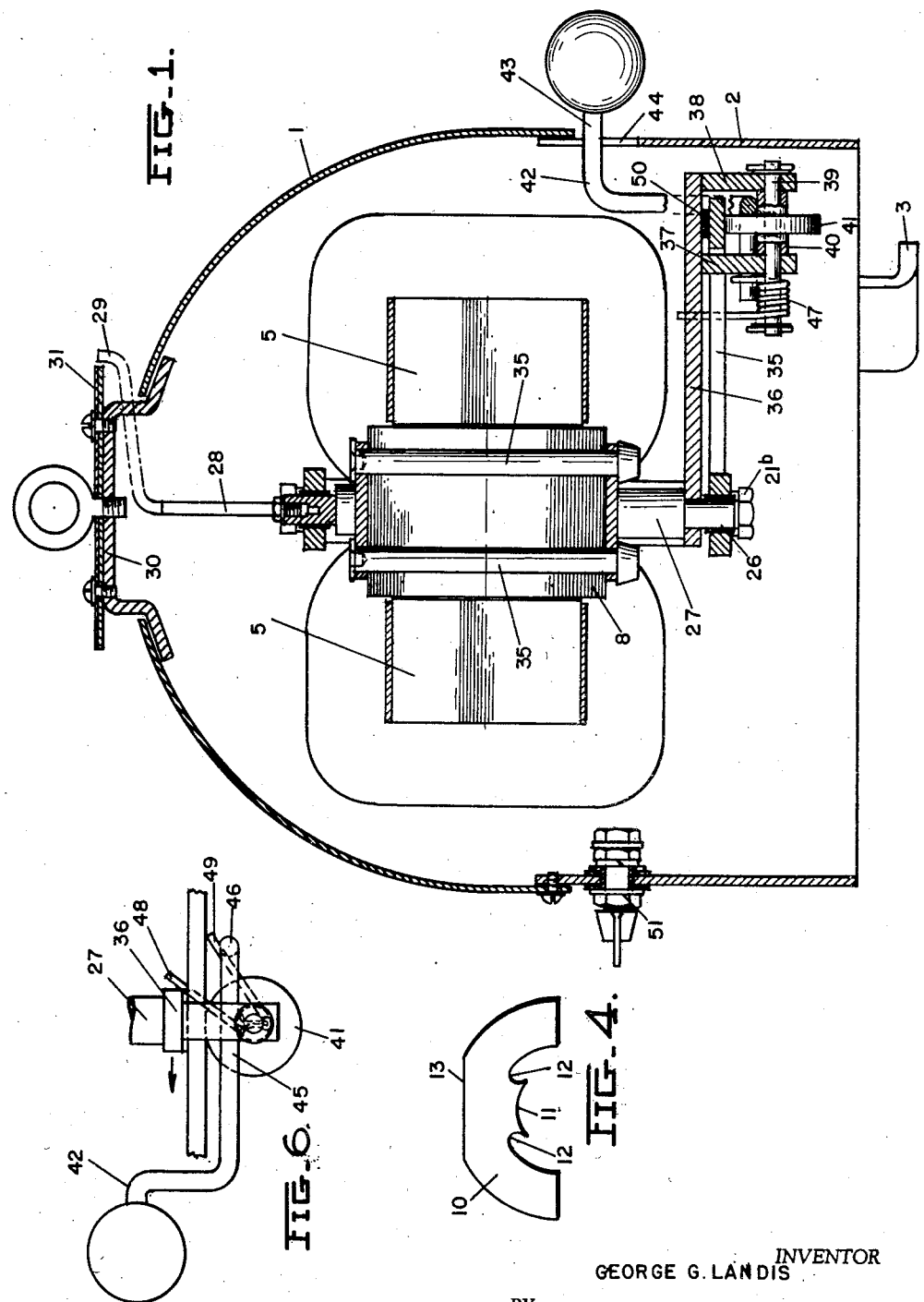
INVENTOR
GEORGE G. LANDIS
BY Oberlin, Limbach + Day
ATTORNEYS

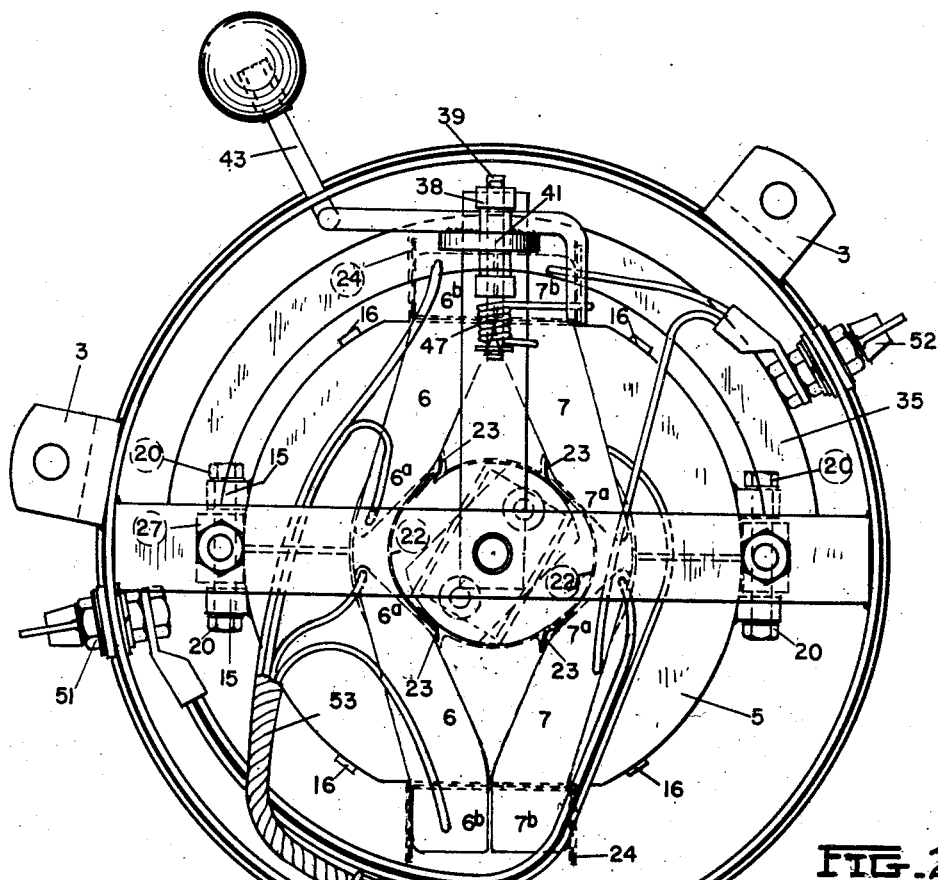
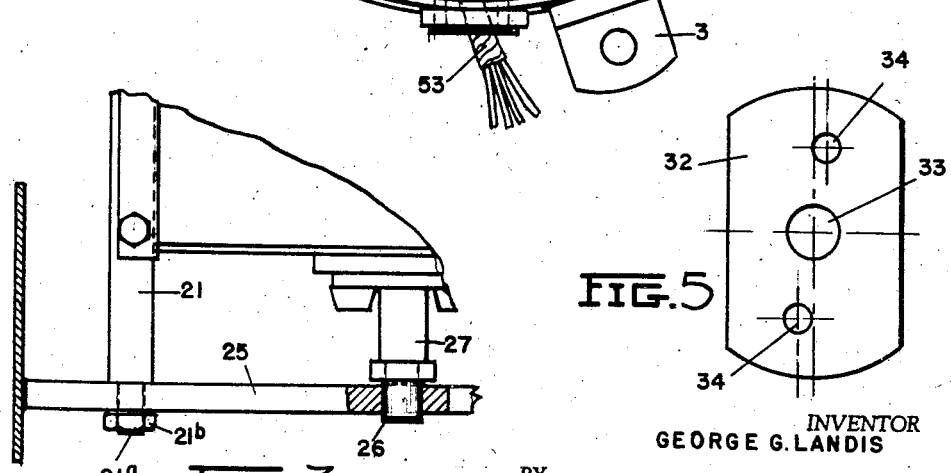

Patented Oct. 20, 1942

2,299,329

UNITED STATES PATENT OFFICE 2,299,329

WELDING TRANSFORMER

George G. Landis, Cleveland, Ohio, assignor to The Lincoln Electric Company, Cleveland, Ohio, a corporation of Ohio Application April 28, 1939, Serial No. 270,566

11 Claims. (Cl. 171—119)

The present improvements relating as indicated to arc welding apparatus have more particular regard to such apparatus wherein alternating current is employed. Still more particularly, the improvements relate to a transformer whereby current of the proper character may be supplied to the welding electrode.

One of the objects of the present invention, accordingly, is the provision of a welding transformer which will be relatively simple in construction so that the parts which will require a minimum of machine work preparatory to assembly of the parts will, at the same time, be exceptionally efficient in operation.

A further object is to permit the use of a rotating magnetic shunt whereby the output of the unit may be varied.

Still another object is to provide a construction whereby the primary and secondary coils may be close-coupled throughout their length except at the point where the leakage flux passes into the magnetic shunt; in other words, the leakage flux is confined to the area enclosed within the main magnetic circuit.

To the accomplishment of the foregoing and related ends, said invention, then, consists of the means hereinafter fully described and particularly pointed out in the claims, the annexed drawings and the following description setting forth in detail certain mechanism embodying the invention, such disclosed means constituting, however, but one of various mechanical forms in which the principle of the invention may be used.

In said annexed drawings:

Fig. 1 is a central section through the housing of a welding transformer embodying my present improvements; Fig. 2 is a bottom plan view of the same; Fig. 3 is a fragmentary sectional view of a portion of the apparatus illustrated in the previous figures, showing particularly the manner in which the rotor and stator are supported within the domed shell; Fig. 4 is a plan view of one of the laminations composing the body of the stator; Fig. 5 is a plan view of one of the laminations composing the body of the rotor; and Fig. 6 is a fragmentary side elevational view of a portion of the rotor-locking device.

In the preferred form illustrated, my improved welding transformer is supported from and at the same time housed (see Fig. 1) within an approximately spherical or domed metal shell 1; such shell or housing being in turn supported on a circular metallic base 2, provided with a plurality of angular feet 3. All the foregoing parts may be readily assembled by welding, and while the interior of the housing is completely open and accessible from beneath for the purpose of placing, removing or adjusting the transformer housed therein, such transformer is nevertheless effectively shielded and protected.

The main elements of the transformer comprise a laminated stator 5 of general hollow cylindrical shape, two pairs of coils 6 and 7 which pass around and are supported by such stator, and a moving rotor or magnetic bridge 8 mounted in a cylindrical space at the center of the stator. The construction of the foregoing parts can be most conveniently described incidentally to a description of their fabrication and assembly.

As shown in Fig. 4, the individual lamination plates or blanks 10, whereof the laminated stator is constructed, are in the form of arc-shaped plates, the centers of which have been stamped out to leave an inwardly directed arcuate portion 11. The inner edge of such projection or tooth is formed on a circle having a diameter slightly larger than the rotor 8 and such projection is formed on each side with a curved recess 12. The external circular edge of the plate is not complete but flatted on a chordal line 13 directly opposite the inward projections 11.

It will be understood that the respective halves of the stator are separately made up out of similar stacks of such laminated plates. Following the assembly of the stack, the latter is placed under pressure by suitable means and bars 15 and tie bars 16 are then applied and secured by welding to the edges of the assembled blanks. The foregoing bars are disposed parallel with the axis of the stator and the bars 15 are located adjacent the inner or diametrical face while the tie bars 16 are located in spaced relation to the bars 15 and each other. It will thus be seen that neither rivets or external clamping means are utilized to hold together the laminations of the stator or rather of the stator half, the welding of the bars being wholly external, so that a laminated construction is retained throughout the assembly. This is made possible by the fact that the laminations are not interleaved but are made up into two complete welded half sections which may be handled as individual units.

Preliminarily to assembling the two half sections to form the complete stator, each such section is provided with coils 6 and 7, these coils being of complementary form and so shaped that their inner portions 6a and 7a respectively, will engage and snugly fit the respective recesses 12 of the assembled stator blanks while their outer portions 6b and 7b will be disposed flat-wise adjacent the flatted portions 13 of such assembled laminations (see Figs. 1 and 2).

The two half sections of the laminated stator with the coils thus placed thereon are now brought into proper juxtaposed position and secured together by means of cap screws 20 that pass through suitable apertures in the outwardly directed flanges of the bars 15 and have threaded engagement with a bar 21 interposed between said flanges and projecting beyond their respective ends for the purpose presently to be described.

Before the cap screws 20 are tightened up, wedges 22 in the form of arcuate plates made of stainless steel or Nichrome or other non-magnetic, high resistance material are placed in position between opposed inner portions 6a and 7a of the complementary coils 6—6 and 7—7. The edges of these plates engage within the recesses 12 of the laminated plates which compose the stator sections and suitable insulation is placed between them and the adjacent coil portions, such insulation being carried around the edges of the plates as at 23 to insulate them from the lamination plates as well. The purpose of this last-named insulation is to prevent any current from flowing from one lamination to another, thereby forming a short circuit to the end lamination, to the plate and to the welded bars, which would otherwise form a short circuit on the main flux passing through the lamination.

After the wedge plates 22 have been properly inserted in place, the cap screws 20 are tightened up so as to bring the juxtaposed faces of the stator half sections into close-fitting contact. While there will be a theoretical air gap left at the contact plane, for practical purposes, a continuous iron path is formed. Plates 24 constituting flat wedges are thereupon driven between the outer coil portions 6b and 7b and the adjacent flat face of each stator section provided by the flatted edges 13 of the component laminations. After being thus driven in the ends of the plates are bent up as shown against the windings 6 and 7. The number of such wedges employed will be determined by the various tolerances, the object being to draw the coils tight without putting undue strain on the wires thereof. The assembly of the stator parts being thus completed, the whole is dipped, baked and pasted in the ordinary manner.

In order to secure the stator within the housing 1, the ends 21a of the bars 21 are passed through correspondingly located apertures in a transverse supporting bar 25 and secured thereto by means of nuts 21b. The respective ends of the transverse bar are welded to the housing wall.

As previously described, the rotor or magnetic bridge 8 is rotatably mounted in the cylindrical space in the center of the stator being carried by a spindle 27, the lower end of which passes through an opening in the transverse bar 25. A bushing 26 of non-metallic material is disposed around the lower end of the spindle 27, and while the spindle is thus rotatably supported on the cross-bar 25, it is electrically insulated therefrom. The upper end of the spindle is provided with an axially and radially extending indicator 28, the outer end 29 of which projects through a slot in the cap-plate 30. The cap-plate 30 is provided with a cover plate 31 which, about its periphery adjacent the end of the indicator 28, bears indicia so that the operator may, by means of the indicator 28, determine the position of the rotor in the transformer. The upper end of the indicator 28 is covered with a suitable electrical insulation and for this purpose, porcelain enamel will be found very satisfactory. The purpose of this insulation is to prevent any electrical currents being set up in the apparatus if the indicator should come in contact with any portion of the frame.

The rotor, or more accurately, the variable magnetic shunt, is of unique construction which may be likewise best described in connection with the manner in which the same is assembled.

In Fig. 5 is shown one of the plates or laminations 32 employed in building up the rotor. These plates are provided with a central opening 33 adapted to receive the spindle 27 and paired openings 34 adapted to receive the rivets or bolts 35. It will be observed that the openings 34 are respectively on opposite sides of the center line of the lamination being symmetrical otherwise with respect to the center of the plate. The rotor is built up by stacking the laminations in such a way that alternately they are angularly related as will occur when alternate laminations are stacked with their complementary faces towards each other with the openings 34 in alignment. This produces a staggered arrangement of laminations in the rotor which is the full equivalent of a conventional skewed construction which is desirable from the standpoint of reducing the amount of pull on the rotor as it is moved into and out of the field between the poles of the stator.

The means for adjusting the position of the rotor within the stator and for maintaining the same in such adjusted position is most clearly illustrated in Fig. 6 and at the bottom of Fig. 1. A semi-annular flat track, generally indicated at 35 (see Fig. 2) is secured at its opposite ends as by welding to the cross-bars 25. An adjusting arm 36 is secured at its inner end to the spindle 27 and at its outer end provided with spaced downwardly projecting arms 37 and 38. In aligned openings in the lower ends of such arms is mounted a shaft 39 on which is rotatably supported a sleeve 40 to which is secured an eccentric cam 41. A manipulating lever generally indicated at 42 has a portion 43 extending through an elongated opening 44 in the outer shell of the transformer and another portion 45 which is welded to one lateral face of the cam member 41. The terminal portion of the handle 46 extends at right angles to the portion 45 thereof, i. e., substantially parallel to the axis of the shaft 39. A coiled spring 47 is carried by an extension of the shaft 39 and one end 48 of such spring bears against the arm 36 and the other end 49 bears against the terminal portion 46 of the handle 42. The spring is so tensioned that the terminals 48 and 49 thereof tend to spread apart. By having reference to Fig. 6, it will be observed, therefore, that the effect of the spring 47 is to tend to rotate the handle 42 which is attached to the eccentric cam 41 in a clockwise direction about the axis of the shaft 39; thus, by virtue of the handle being secured to the eccentric cam, the effect of the spring is to tend to rotate such eccentric cam in a clockwise direction as viewed in Fig. 6.

A friction block 50 is secured to the lever 36 intermediately of the arms 37 and 38 so that when the eccentric cam 41 is urged in a clockwise direction, as viewed in Fig. 6, the effect of the same is to force the track 35 against such friction member 50 so that the parts are frictionally secured in adjusted position. It will be observed that the construction of the transformer is such that the rotor, when the transformer is energized, tends to pull in one direction only. Since the arm 36 is connected to the spindle 27 of the rotor, as viewed in Fig. 6, the direction of pull on the arm 36 is indicated by the arrow on Fig. 6. It will be observed that the latch is, therefore, a self-energizing one in that the direction of pull always tends to increase the force between the track 35 and the friction member 50. When the operator wishes to change the setting of the rotor, he merely presses down on the ball which is secured to the end of the handle 42, thus rotating the eccentric cam 41 in a counter-clockwise direction, as viewed in Fig. 6, freeing the arm 36 from the track 35, whereupon, the operator may then shift the arm 36 to any desired position and when the handle 42 is released, the parts will immediately be restored to a locking position.

As most clearly shown in Fig. 2, the two coils 6—6 which constitute the primaries of the transformer, are connected together and connected to the source of current which may be any voltage, at any A. C. frequency, depending upon the design of the equipment. The coils 7—7 which constitute the secondaries, are likewise connected together, either in series or in parallel, depending upon the design, and the terminals of these two coils brought to the arc circuit. No other electrical connections are required. For the purpose of conveniently connecting the welding circuit leads to the coils, the secondary leads of the latter may be provided with binding posts 51 and 52. Such binding posts will, of course, be adequately insulated from the wall to which it is thus fastened.

The leads for the primary coils 6—6 may be conveniently brought together and bound in a single cable 53 which is then carried through an appropriate opening provided therefor in the wall of the casing.

The operation of the apparatus will now be described. When no current is being drawn from the secondary coils 7—7, that is, when the electrode and ground leads of the welding apparatus are open-circuited, the flux produced by the primary coils, 6—6 flows around the laminated ring of the stator and produces a voltage in such secondary coils. For the purposes of the following description, I shall refer to the magnetic bridge, when it is in alignment with the poles 11 of the stator, as being in the closed position and when at right angles thereto, as being in the open position. This secondary open circuit voltage will be substantially constant regardless of the position of the rotor, although slightly more when the rotor is in the open position shown.

When the arcing circuit is shorted, current will flow in the secondary coils 7—7 dependent upon the amount of magnetic leakage between the primary and secondary coils, such leakage being controlled by the position of the rotor. Thus, when the latter is in the closed position, a large percentage of the primary flux will be shunted across the air gap and through the rotor without passing through the secondary coils. This will give a minimum output, the amount depending upon various factors; particularly upon the length of the air gaps between the rotor and stator and to some extent, upon the sections of the various magnetic paths.

If the rotor be now rotated from the closed position to the full open position, the air gap between the circuits of the rotor and the teeth of the stator may be increased to any desired value, the short circuit current in the secondary winding being at a maximum in full open position of the rotor. While such short circuit current will be somewhat less than that which should be obtained if the rotor were removed entirely, it will, in general, be greater than the maximum current as determined by other factors of design such as inherent resistance and reluctance, which may be used to advantage in welding. The amount of variation in welding current, which can be obtained by rotating the rotor through the indicated 90° arc, can theoretically be made practically anything, but actually, considering usable values for air gap length which are necessary for both mechanical clearance and welding performance, the variations which can be obtained between the two extreme positions of the rotor will be represented by a value in the order of 15 to 1. It will be understood that this value is not fixed in any way but will be determined by purely practical considerations in designing the apparatus for commercial use.

The air gap between the surfaces of the rotor and the teeth of the stator can be made as low as 0.010 inch, so far as mechanical considerations are involved, but in order to give a satisfactory welding performance, such air gap will ordinarily be greater, it having been found in practice that a very large percentage of the leakage ampere turns which force the flux through the leakage path must be in the air circuit and not in the iron circuit in order to give satisfactory welding performance. By way of illustration, if 90–95% of the turns are in the air gap, the apparatus will give the best welding performance of which it is capable; whereas, if 90% of the ampere turns are in the iron, performance will be relatively less efficient.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a transformer, the combination of a laminated stator of hollow cylindrical form, said stator comprising two half sections closely clamped together, each having a central inwardly directed arcuate projection, a primary coil and a similar secondary coil encircling each such stator section, the inner portions of said coils respectively lying adjacent opposite sides of the projection on such stator section and the outer portions of such coils lying adjacent each other, whereby there is provided a pair of oppositely extending primary coils and a corresponding pair of oppositely extending secondary coils, the coils of each pair being suitably connected together, and a rotatable magnetic shunt within said stator.

2. In a transformer, the combination of a laminated stator of hollow cylindrical form, said stator comprising two half sections closely clamped together, each having a central inwardly directed arcuate projection, a primary coil and a similar secondary coil encircling each such stator section; the inner portions of said coils respectively lying adjacent opposite sides of the projection on such stator section and the outer portions of such coils lying adjacent each other, and a rotatable member within said stator forming a magnetic bridge between said projections, the air gap between said member and the projections on said stator being such that a large percentage of the leakage ampere turns will be in the air circuit.

3. In a transformer, the combination of a laminated stator of hollow cylindrical form, said stator comprising two half sections closely clamped together, each having a central inwardly directed arcuate projection, a primary coil and a similar secondary coil encircling each such stator section, the inner portions of said coils respectively lying adjacent opposite sides of the projection on such stator section and the outer portions of such coils lying adjacent each other, and a rotatable member within said stator forming a magnetic bridge between said projections, the air gap between said member and the projections on said stator being such that approximately 90% of the leakage ampere turns will be in the air circuit.

4. The combination with a laminated stator element in the form of a half section of a hollow cylindrical body, such section made up of a plurality of arc-shaped plates held together under desired pressure by bars welded to the outer edges of said plates; of a primary coil and a secondary coil encircling such section, the inner portions of said coils being held in spaced apart relation and their outer portions lying closely adjacent each other.

5. The combination with a laminated stator element in the form of a half section of a hollow cylindrical body, such section made up of a plurality of arc-shaped plates held together under desired pressure by bars welded to the outer edges of said plates, said plates having central, inwardly directed projections and flatted outer edges opposite such projections; of a primary coil and a secondary coil encircling such section, the inner portions of said coils lying on opposite sides of said projections and their outer portions lying closely adjacent each other on the flatted face of the section.

6. In a transformer, the combination of a laminated stator of hollow cylindrical form, said stator comprising two half sections closely clamped together, each having a central inwardly directed arcuate projection, a primary coil and a similar secondary coil encircling each such stator section, the inner portions of said coils respectively lying adjacent opposite sides of the projection on such stator section and the outer portions of such coils lying closely adjacent each other, and a rotatable member within said stator forming a magnetic bridge between said projections.

7. The combination in a close-coupled electric transformer, of primary and secondary coils separated at a point within the contour of the main magnetic circuit, and an adjustable magnetic bridge providing a variable air gap at such point.

8. The combination with a laminated stator element in the form of a hollow cylindrical body, said body being made up of a plurality of annular plates held together under pressure; of a primary coil and a secondary coil encircling such body, the inner portions of said coils being held in spaced apart relation and their outer portions lying closely adjacent each other.

9. The combination with a laminated stator element in the form of a hollow cylindrical body, said body being made up of a plurality of annular plates held together under pressure, said plates having central, inwardly directed projections; of a primary coil and a secondary coil encircling such body, the inner portions of said coils lying on opposite sides of said projections and their outer portions lying closely adjacent each other.

10. In a transformer, the combination of a laminated stator of hollow cylindrical form, said stator being made up of a plurality of annular plates held together under pressure, said plates being formed to provide a central, inwardly directed projection on said stator, a primary and a secondary coil encircling said stator, the inner portions of said coils being respectively spaced apart by and lying adjacent said projection, the outer portions of said coils lying adjacent each other, and a rotatable member positioned centrally of said stator and cooperating with said projection to provide a variable magnetic shunt.

11. A transformer having primary and secondary windings, said transformer including a stator of magnetic material upon which said primary and secondary windings are arranged, said primary and secondary windings arranged on said stator very closely to each other, as in a closely coupled transformer, throughout the major portion of their extent, and substantially separated, as in a loosely coupled transformer, in a local area, and a variable magnetic bridge between opposite portions of said stator in the area of separation of said windings.

GEORGE G. LANDIS.